Inventors
Mary E. Aiken
Mary J. Rummel

Patented May 20, 1952

2,597,425

UNITED STATES PATENT OFFICE 2,597,425

METHOD OF OPTICAL TESTING OF MATERIALS WITH A TRANSPARENT SCREEN

Mary E. Aiken and Mary J. Rummel, Pittsburgh, Pa., assignors to H. J. Heinz Company, Pittsburgh, Pa., a corporation of Pennsylvania Application June 23, 1948, Serial No. 34,578

4 Claims. (Cl. 88—14)

This invention relates to the testing of materials by a process requiring optical inspection, and is for a method of the optical inspection of liquid or semi-liquid substances, or of finely divided solids. The invention is particularly applicable to the testing of tomato products such as ketchup and tomato paste, and it will be hereinafter specifically described in connection with such products. However it is also applicable to the testing of other products, as for example edible pastes and soups of various kinds, creamery and nut butter, paints, cosmetic preparations, flour, or meal and the like.

In the manufacture of tomato products, such as ketchup and tomato paste, it will be found that black specks will appear in it and also there will appear short white string-like fibers. While these do not affect the quality of the products for food purposes, it is desirable to maintain such substances below a predetermined arbitrary maximum, and if the specks and/or fibers exceed such standard, to either discontinue the use of tomatoes from the source which is responsible, or to use only a restricted quantity of such tomatoes along with others from a different source to maintain the average under the arbitrary standard.

At the present time it is the practice in certain food packing establishments where attention is given to this problem, to remove sample bottles of the product, as for example ketchup, from the production line at frequent regular intervals. These are delivered to the food control laboratory where girls, trained to the procedure, scan the bottles. Specks and fibers close to the interface between the glass and ketchup may be seen through the glass. The specks are counted over a given area, and of course only the specks immediately adjacent the glass are visible. The count is recorded on specially prepared charts, and is classified in the case of specks, according to three classes: large, medium and small. When the laboratory finds more than an arbitrary maximum, corrective measures are taken. Fiber content may be determined in the same inspection.

The procedure is quite unsatisfactory, first because of the difficulty of seeing the specks; secondly, because the orientation is quite random, and large specks may be edgewise, and finally, the shape of the bottle is not such as to provide for a reasonably accurate survey to be made. Two persons examining the same bottle may reach quite widely different results. Moreover, this method is only applicable to the product after it is in the bottle.

The present invention has for its object to provide a method by which a standardized test may be established, the test conducted with far less difficulty, due to the greater ease with which particles can be tested, and in which a more nearly uniform orientation of particles is procured.

Our invention may be more fully understood by reference to the accompanying drawing in which.

Figure 1:
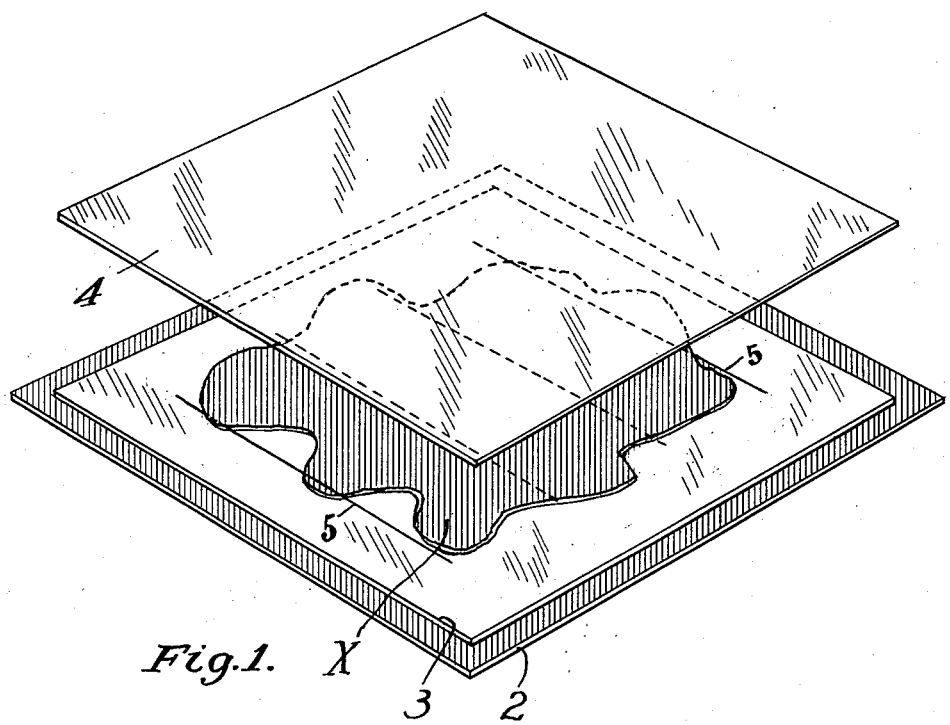
Fig. 1 is a perspective view showing an initial step in the practice of our method and showing the apparatus; and in the drawing the cross hatching is intended to represent color—in this case red.

In the drawings, 2 designates a plate, preferably opaque, and having one surface colored to closely match the color of the product to be examined when the product is viewed entirely by reflected light. For example, ketchup when viewed, as in a bottle, by reflected light, is a deep red, whereas if it is spread on glass in a thin film and viewed by transmitted light, it is an orange-red. Hence for examining ketchup the top surface of the plate 2 is a rather deep red. The plate is preferably formed of metal with the coating of vitreous enamel so as to withstand repeated washing and wetting.

In use, this plate is wet with water or a small body of water is poured onto it, and then a clear transparent glass plate 3 is placed over it and pressed down so that there is then a thin film of water between the colored metal and the glass. The water being present causes the true color to be transmitted through the glass, whereas if the water is not present there is an "off" color to the base plate.

A measured amount of ketchup or other tomato product, as for example a tablespoonful or any other adequate measured quantity, is then poured on the plate 3 and is spread around with a clean knife or spatula. This smear is designated X. When thus spread, a second sheet of transparent glass 4 is pressed down over it, spreading the food product to an even thinner film.

When so spread, the specks, which are flake-like, are practically all flat, and their shape and size is more readily seen. Contrary to expectations, the specks are much more visible against the colored background than they are when placed against a white background. They are also more easily discerned than if the sandwich of food product and two sheets of glass were held toward the light.

In the case of another food product, as for example green pea soup, much better analysis of the product may be made if the plate 2 is colored to the color of the pea soup as it appears in an open can or bowl under reflected light.

Figure 2:
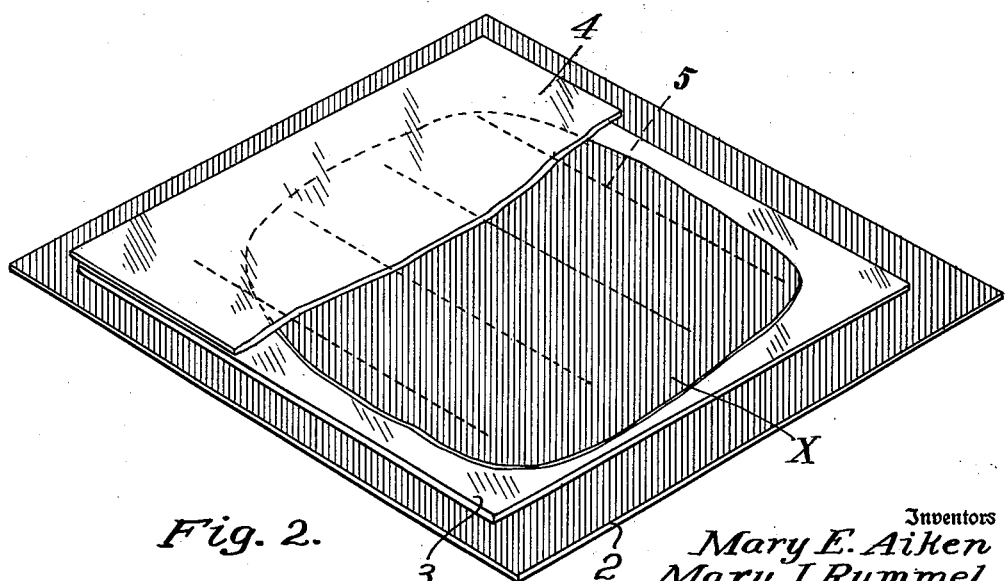
Fig. 2 is a similar view showing the final step.

One or the other of two glass plates may be scored or marked with heavy lines 5, Figs. 1 and 2, to divide the area roughly into zones, so that the inspector may count particles in each zone.

The invention provides a test which can be standardized to a far greater extent than has heretofore been possible. This is so because a measured amount of product is used on each test. Spread each time with a clean knife blade or spatula, the amount which will cling to the knife or spatula will always be about the same. It is always squeezed to about the same film thickness and the particles of flake-like or long character are more nearly oriented to the same plane. The particles are viewed always in a film, as distinguished from a bottle where some specks or fibers may be next to the glass and some further back in the mass where it may or may not be counted. Further standardization is practical if only a certain area of the total is outlined. For example, in successive tests, conditions are more likely to be substantially the same in the area around the center than at the edges. Finally, the inspector can see the specks or fibers clearly and can gauge their classification as to size much more readily. For fibers in tomato products, it is sometimes preferable to have one side of the plate 2 white, and to turn the plate over for fiber analysis.

In testing highly fluid products, a measured amount of any suitable thickening material may be added to a measured amount of the liquid to be tested. For example, in testing fruit or vegetable juices, or other watery products, a well-known thickening agent such as sodium carboxymethylcellulose may be used. This specific one is mentioned because of its being colorless and rapid, but other well-known substances, such as water-soluble gums or the like may be employed.

In testing very thick solids or semi-solids, a solvent or thinner may be used. In the case of finely divided solid substances, a paste may be prepared, as this has better light-transmitting qualities and can be spread more evenly than the dry material.

Various changes and modifications within the contemplation of our invention will suggest themselves to those skilled in the art, all within the scope of the following claims.

We claim:

1. A method of testing food products such as tomato products to determine the number of visible particles therein which are of a different color than the food product under test comprising placing a measured quantity of tomato product between two smooth transparent plates and compressing the plates to spread the product into a film of a thickness which will arrange the specks or fibers in a flat, flake-like position, placing the plates with the product therebetween over an opaque bright red plate with a thin film of water between one of said transparent plates and the opaque plate, and counting the visible particles which are of different color than the food product under test in a measured zone of a transparent plate.

2. The method of defined in claim 1 in which the sample of tomato product is spread into a film sufficiently thin to preserve its moisture content until after a count has been made.

3. The method defined in claim 1 in which the arrangement of the plates is such that the counting of visible particles which are of different color than the food product under test is carried out with reflected light only.

4. A method of testing food products of the character described, which comprises placing a measured quantity of the food product on a smooth transparent colorless plate and spreading it over the plate, pressing another similar smooth plate over the product so spread to squeeze it into a film to arrange contaminants therein in a visible flat position, placing the two plates with the film of product between them over an opaque plate the color of which is similar to the color of the product when viewed by reflected light, placing a film of clear transparent liquid between the colored base plate and the adjacent transparent plate, and counting the visible contaminants in a fixed area of a transparent plate.

MARY E. AIKEN.
MARY J. RUMMEL.

REFERENCES CITED

The following references are of record in the file of this patent:

UNITED STATES PATENTS

| Number | Name | Date |
|---|---|---|
| 1,468,075 | Pfund | Sept. 18, 1923 |
| 1,829,472 | Buck | Oct. 27, 1931 |
| 2,063,222 | Beau | Dec. 8, 1936 |
| 2,182,499 | Ott | Dec. 5, 1939 |
| 2,245,557 | Franzman | June 17, 1941 |

FOREIGN PATENTS

| Number | Country | Date |
|---|---|---|
| 2,337 | Netherlands | Mar. 1, 1918 |
| 587,315 | Great Britain | Apr. 22, 1947 |